Figures 1, 2:
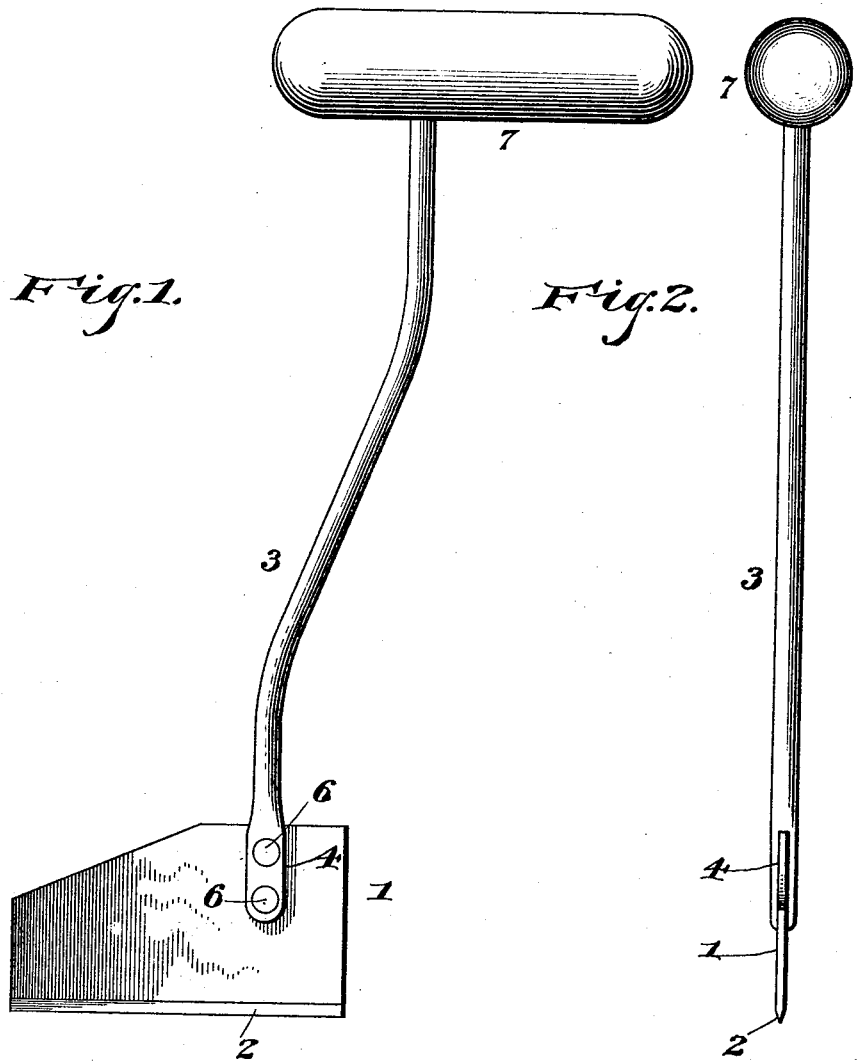

(No Model.)

H. D. BOURLAND.
TOBACCO KNIFE.

No. 513,077. Patented Jan. 23, 1894.

Witnesses:
B. S. Ober
W. S. Duvall

Inventor
Harry D. Bourland,
By his Attorneys.
C. A. Snow & Co.

UNITED STATES PATENT OFFICE.

HARRY D. BOURLAND, OF MADISONVILLE, KENTUCKY.

TOBACCO-KNIFE.

SPECIFICATION forming part of Letters Patent No. 513,077, dated January 23, 1894.

Application filed October 23, 1893. Serial No. 488,923. (No model.)

*To all whom it may concern:*

Be it known that I, HARRY D. BOURLAND, a citizen of the United States, residing at Madisonville, in the county of Hopkins and State of Kentucky, have invented a new and useful Tobacco-Knife, of which the following is a specification.

My invention relates to improvements in tobacco knives, or in other words, those knives employed for cutting green tobacco in the field.

The object of my invention is to provide a knife which by reason of certain peculiarities and dispositions of parts thereof will enable the operator to handle the knife in an easy and convenient manner without side or lateral straining, and which will cause the knife-blade to act squarely upon the stems of the plants and without injury to the leaves thereof.

With this and other objects in view the invention consists in certain features of construction hereinafter specified and particularly pointed out in the claim.

Referring to the drawings:—Figure 1 is a side elevation of a tobacco-knife embodying my invention. Fig. 2 is a rear elevation.

Like numerals of reference indicate like parts in both the figures of the drawings.

In the practice of my invention I employ a substantially oblong cutting-blade 1, whose lower edge is beveled to form a cutting edge 2, and whose upper front corner is preferably cut away so as to facilitate the insertion of the blade in contracted spaces. I employ a shank 3, which at its lower end is bifurcated at 4 to embrace the blade, and is located upon the upper edge thereof at one side of the longitudinal center, or in other words, at a point adjacent to the heel, though, as shown, not at the heel. The sides of the bifurcation are provided with rivet-holes, and through the same rivets 6 are passed. The shank extends at a right angle from the blade for a short distance, or in other words, extends vertically therefrom, and is then bent rearward or toward the heel to a point above and slightly beyond the same, and then further extended vertically or at a right angle to the blade, and has mounted upon its upper end a handle 7.

This handle 7 is parallel to the blade and at a direct right angle to the shank, and the latter is let into the handle at a point in front of the center of the same. It will be seen that when grasping the handle the hand of the operator, as well as the handle, is off from the plant, whereas the blade is directly at the stems thereof, and that by a direct vertical pressure the said stems may be severed without injuring the leaves of the remaining stems by being bruised or mangled through either action of the knife or contact with the hand and handle. It will furthermore be seen that any pressure exerted is the same throughout the cutting-edge, that is to say the heel will not be forced down and the toe elevated or vice versa, also the action of the knife will be square upon the stem, thus facilitating the cutting and avoiding any straining of the hand or any unusual or inconvenient handling of the device in obtaining this desired result.

I am aware that tobacco knives have been provided with handles and shanks, but I am not aware that there ever has been provided a tobacco-knife having a straight edge, which as is well known is very desirable, and combining therewith a handle and shank, the latter being so disposed as to compel the edge to bear squarely upon the plant, and yet at the same time to avoid contact with the leaves by the hand of the operator or handle of the device.

Having described my invention, what I claim is—

The herein described improved tobacco-knife, the same consisting of a blade, and a compoundly curved handle secured to the blade in rear of the longitudinal center thereof and terminating at a point in rear of the heel of the blade, and a handle arranged upon the upper end of said shank, substantially as specified.

In testimony that I claim the foregoing as my own I have hereto affixed my signature in the presence of two witnesses.

HARRY D. BOURLAND.

Witnesses:
CHARLES M. BOURLAND,
FERRIS F. BROWN.